P. C. VANG.
VALVE SPRING REMOVER.
APPLICATION FILED MAR. 7, 1919.

1,328,776.

Patented Jan. 20, 1920.

Inventor
P. C. Vang
By Philip A. H. Serrell
his Attorney

UNITED STATES PATENT OFFICE.

PEDER C. VANG, OF OMAHA, NEBRASKA.

VALVE-SPRING REMOVER.

1,328,776.　　　　　Specification of Letters Patent.　　Patented Jan. 20, 1920.

Application filed March 7, 1919. Serial No. 281,163.

*To all whom it may concern:*

Be it known that I, PEDER C. VANG, a subject of the King of Denmark, residing at Omaha, in the county of Douglas and State of Nebraska, have invented certain new and useful Improvements in Valve-Spring Removers, of which the following is a specification, reference being had therein to the accompanying drawing.

The invention relates to tools for releasing valve springs of internal combustion engines, and has for its object to provide a valve spring release of simple construction whereby the spring of a valve may be compressed and held in compressed condition so that the pin or other bearing means, normally engaged by the lower end of the spring may be easily removed from the valve stem. Also to provide means carried by the valve spring release, whereby the spring may be held in compressed position or allowed to expand under the control of the operator of the valve spring releasing tool.

A further object is to provide a valve spring releasing tool comprising a member normally at right angle to the valve stem and having a depending pointed shaft for engagement with the depression on the top of the valve, said member having a vertically adjustable rod extending through the same and extending downwardly, the lower end being pivoted to a rockable lever the end of which being adapted to engage the lower end of a valve spring so that when the rockable lever is forced downwardly the valve spring will be compressed. Also to provide the rockable lever with an upwardly extending rack pivoted thereto and passing through an aperture in the first mentioned member, which is provided with a spring detent in engagement with the teeth of the rack so that the rockable lever may be locked in its downward position, said spring detent being capable of side pivotal action for releasing the end thereof from engagement with the teeth of the rack so as to release the rockable lever.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 2:
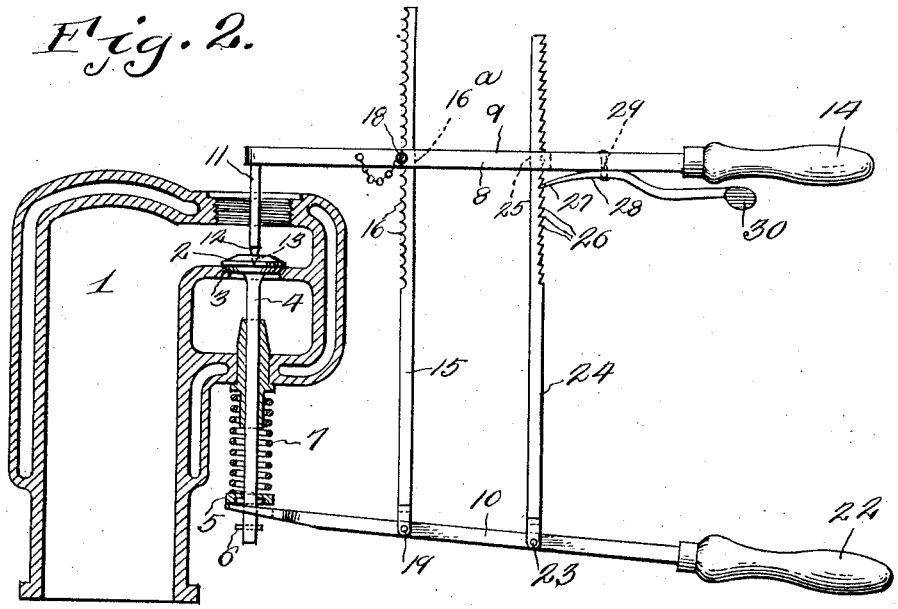
Fig. 2 is a sectional view through an internal combustion engine showing the tool applied thereto and in operation.
Figure 1:
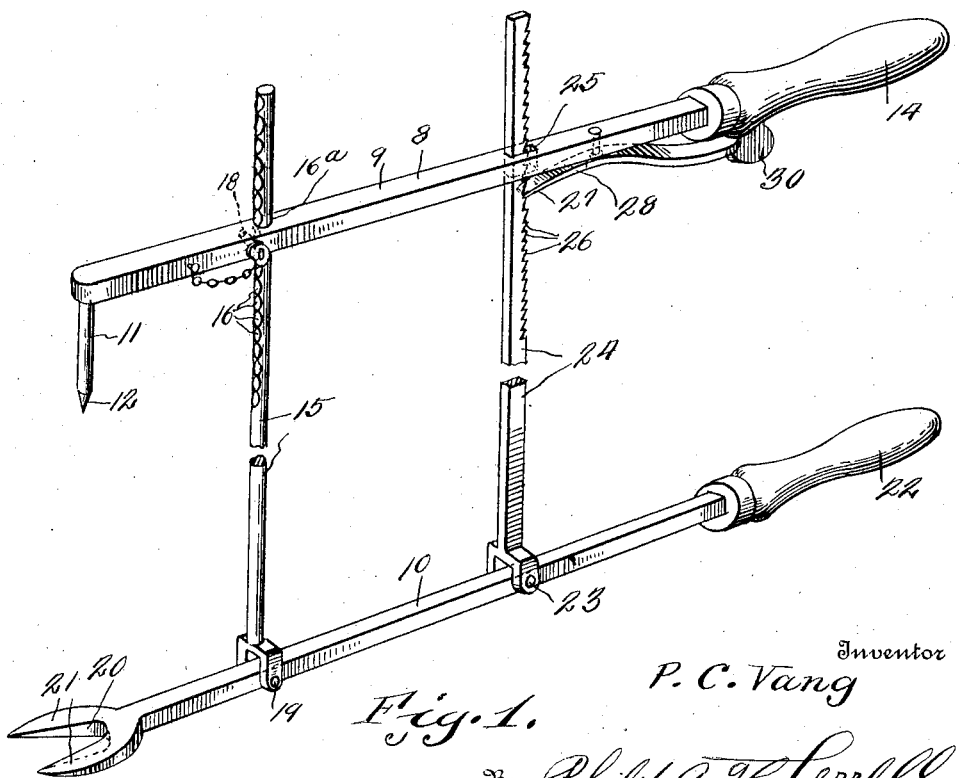
Figure 1 is a perspective view of the valve spring releasing tool.

Referring to the drawing the numeral 1 designates a conventional form of internal combustion engine, which is provided with the usual form of valve 2 which coöperates with a valve seat 3. The valve 2 is provided with the usual stem 4 extending downwardly through the casing of the engine, there being a washer 5, which is adapted to engage the upper side of the pin 6, said pin being transversely disposed through the stem 4 and prevents the washer from coming off of the stem. A coiled spring 7 is provided and which spring has its lower end in engagement with the upper surface of the washer, while its upper end engages the casing of the engine. This spring exerts an outward pressure upon the washer, therefore normally keeps the valve 2 in engagement with the valve seat 3.

The valve spring removing tool 8 comprises a horizontal bar 9 and a rockable lever 10, which is substantially parallel to the bar 9. One end of the bar 9 is provided with a downwardly extending pin 11 having a point 12, which is adapted to engage a depression 13 in the valve 2, while the other end of the bar 9 is provided with a handle 14 adapted to be grasped by the operator. A vertical rod 15 extends through an aperture 16ª in the bar 9 and is provided with a series of segmental notches which are engaged by a pin 18 extending transversely through the bar 9 so that the rod 15 may be adjusted at various vertical positions. The lower end of the rod 15 is pivoted as at 19 to the rockable lever 10, said pivotal point forming a fulcruming point for the rockable lever. One end of the rockable lever 10 is provided with a V-shaped notch 20 adapted to receive the valve stem so that the arms 21 formed by the V-shaped notch will engage under the washer 5, the other end of the rockable lever is provided with a handle 22 adapted to be engaged by the hand of the operator for rocking the lever 10 when it is desired to compress the spring 7.

Pivoted as at 23 to the rockable lever 10 is a vertical rack bar 24 which extends upwardly through an aperture 25 in the bar 9, said rack bar being provided on one of its sides with ratchet teeth 26, which are adapted to be engaged by the end 27 of a spring detent 28 so that the rack bar 24 will be held in any position to which it may be moved when the rockable lever 10 is rocked downwardly at its handle end to compress the spring 7. The spring detent 28 is pivoted at 29 to the bar 9 and extends rearwardly under the handle 14 and terminates in a thumb piece 30 adapted to be engaged by the thumb of the operator, so that the spring detent may be moved horizontally so that the end 27 will come out of engagement with the teeth 26, thereby releasing the rockable lever and the spring 7.

The operation is as follows, the end of the pin 11 is placed in engagement with the valve 2, then the rod 15 is adjusted vertically to its proper position, the V-shaped notch being in engagement with the valve stem 4 under the washer 5. When in this position the pin 18 is passed through the bar 8 into engagement with one of the segmental notches 16. When in this position the operator grasps the handle members 14 and 22 and forces the handle 22 downwardly, which action forces the other end of the rockable lever upwardly, thereby compressing the spring 7. During this downward movement of the handle 22, the rack bar 24 moves downwardly and the end 27 of the spring detent 28 ratchets over the teeth 26 and when the downward movement of the handle is stopped, the detent holds the rockable lever in whatever position it has been moved to, thereby allowing the removal or replacing of the pin 6 in the valve stem 4. When the pin has been removed or replaced, the operator then grasps the handle members 14 and 22, then he places the thumb of the hand that is grasping the handle 14 in engagement with the thumb piece 30 of the spring detent 28, forces the same to one side until the end 27 is out of engagement with the ratchet teeth 26. When this is done he allows the handle 22 of the rockable lever to be forced upwardly under the influence of the spring 7, until the washer is in engagement with the pin 6, or if he is removing the spring until the same has expanded to its maximum.

The invention having been set forth, what is claimed as new and useful is:—

1. A valve spring release comprising a normally horizontal bar having at one of its ends a depending pin adapted to engage the upper face of a valve, a vertically adjustable bar adjustably secured to the horizontal bar, a rockable lever pivoted to the lower end of the vertically adjustable bar, one end of said rockable lever being adapted to engage under a valve spring, said horizontal bar and rockable lever being provided with handle members, a vertically disposed bar pivoted to the rockable lever and provided with ratchet teeth and detent means carried by the horizontal bar and coöperating with the ratchet teeth whereby the rockable lever will be held to any position to which it may be rocked.

2. A valve spring release comprising a normally horizontal bar having at one of its ends a depending pin adapted to engage the upper face of a valve, a vertically disposed bar secured to the horizontal bar and having a rockable lever pivoted to the lower end thereof, one end of the rockable lever being adapted to engage the lower end of a valve spring, handle members carried by the horizontal bar and rockable bar, a vertically disposed rack bar pivoted to the rockable bar and extending through an aperture in the horizontal bar, a spring detent pivotally secured to the horizontal bar and having its end in engagement with the teeth of the rack bar so as to hold the rockable bar in the position to which it may be moved and means whereby the tooth engaging end of the spring detent may be moved in a horizontal plane so as to release the rack bar to allow the upward pivotal movement of the handle end of the rockable lever.

In testimony whereof I hereunto affix my signature.

PEDER C. VANG.